United States Patent
Schneider

[11] 3,725,734
[45] Apr. 3, 1973

[54] ELECTRONIC FLASH DEVICE
[75] Inventor: Arthur Schneider, Wiesenweg, Germany
[73] Assignee: Rollei-Werke Franke & Heidecke, Braunschweig, Germany
[22] Filed: Mar. 9, 1971
[21] Appl. No.: 122,411

[30] Foreign Application Priority Data
Mar. 11, 1970 Germany..................P 20 11 432.3
Mar. 13, 1970 Germany..................P 20 11 905.5
Mar. 14, 1970 Germany..................P 20 12 150.0

[52] U.S. Cl..............315/241 P, 315/151, 315/159, 315/240
[51] Int. Cl..............................................H05b 37/00
[58] Field of Search......315/151, 159, 227, 241 R, 241 P

[56] References Cited
UNITED STATES PATENTS 3,590,314  6/1971  Krusche..........................315/159
3,515,938  6/1970  Morse.........................315/241 R X
3,546,529  12/1970  Griffin..........................315/241 P FOREIGN PATENTS OR APPLICATIONS
839,768  6/1960  Great Britain...................315/241 P Primary Examiner—Roy Lake
Assistant Examiner—Lawrence J. Dahl
Attorney—Charles Shepard and Stonebraker & Shepard

[57] ABSTRACT

Electronic flash apparatus for photographic purposes, comprising a flash tube and a series of capacitors providing power for flashing the flash tube. When the flash tube is triggered, only one capacitor is connected across the flash tube. One or more additional capacitors are then switched into the flash tube circuit, for additional flash illumination, depending upon the amount of light required for the photograph. In one embodiment of the invention, the switching of additional capacitors into the flash tube circuit is controlled by the amount of light reflected from the subject being photographed.

10 Claims, 5 Drawing Figures

ELECTRONIC FLASH DEVICE

The subject invention applies for electronic photographic flash devices having several parallel-to-their-flash-tube operable or switchable storage capacitors.

With such units the capacitors are circuited directly in parallel with the flash tube, so that on this being triggered, they discharge jointly over it. To adapt the resultant power consumption to actual incurred requirements, the necessary total capacity was provided for by a manual on- or off-circuiting respectively of several individual capacitors. With the total power available not called for, a certain number of additional capacitors must be switched off and, provided an effective saving in power is to be achieved, the necessary rating must be accurately estimated prior to every individual exposure.

The purpose of the subject invention is to self-determine the required power rating in such a manner that the first capacitor remains always circuited in parallel with the flash tube. The remaining ones are, via electronic switches (switching diodes, thyristors, SCR), interlinked with the flash tube and are, by means of a photoelectric measuring device connected, in the required number, parallel to the flash tube.

This can be achieved by various means. For one, it can be so effected that subsequent to the triggering of the flash tube and the commencement of main capacitor's discharging, the auxiliary capacitors are stepwise connected up and that this switch-on procedure is interrupted once the luminous intensity measured by the photoelectric measuring device has reached the preselected value, i.e., the photograph to be taken is correctly exposed.

Provided the flash unit is furnished with a photoelectrically controlled quenching device, i.e., a quench tube or thyristor which, on obtainment of the pre-set luminous intensity, short-circuits the flash tube, the quench tube current can be used to avert or interrupt respectively the discharging of the not yet switched-on or not yet discharged additional capacitors respectively. This can also be accomplished by a photoelectric measuring device which, on reaching the pre-set threshold-value of the luminous intensity, generates an impulse which, in turn, interrupts a further on-circuiting of the auxiliary capacitors. Lastly, there can be provided in lieu of an integrating measuring photoelectric device, a photodiode or a photothyristor (LASCR) which, after a defined period subsequent to the flash tube's ignition, generates a voltage impulse proportional to the measured reflexion light intensity and which then determines the number of auxiliary capacitors to be activated and those not.

The appended drawings show several design examples.

Figure 3:
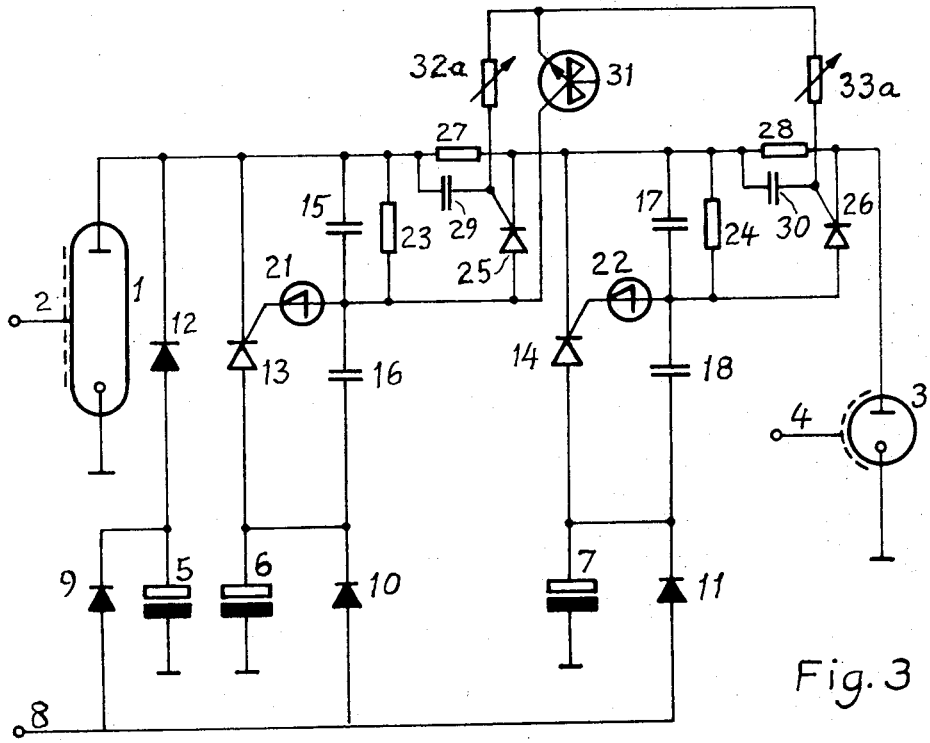
Figure 4:
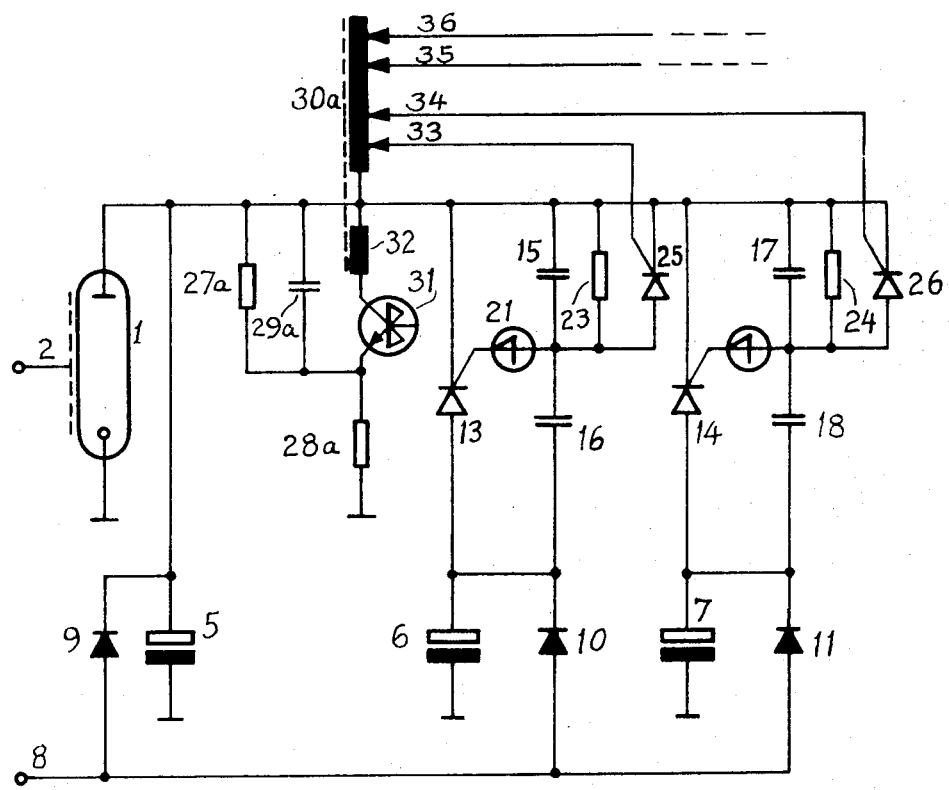

FIG. 3 displays a combination of the afore-mentioned design lay-outs, utilizing a photodiode and, finally, FIG. 4 shows a circuit design in which a non- or a short-time integrating measurement is carried out and where, subsequent to the triggering of the main flash tube, there are circuited-on the necessary number of auxiliary capacitors at once.

Flash tube 1 is depicted with the conventional type ignition electrode 2, the actual ignition circuit being no different from the generally known arrangements. The triggered or ignited flash tube 1 can be quenched prematurely by short-shunting. As a shunting means there is, for instance, used a SCR- or a quenching tube 3. The photoelectric measuring device generates a voltage proportional to the luminous intensity which, on exceeding an ajustable preselected threshold value, supplies the triggering or ignition impulse for the quenching tube 3.

Measuring devices of this type are known, for which reason no detailed explanation may be given. However, it is deemed worth mentioning that the subject invention is not necessarily or positively dependent on an integrating measurement of the light or intensity, there can be utilized also a short-time or punctiform measurement of the light reflected by the object being photographed — this being explained in detail further on in this paper under the design lay-out as per FIG. 4.

In our design example, the feed capacitor's overall capacity is subdivided among three capacitors viz. 5, 6 and 7 which, via the feed cable 8, are charged over diodes 9, 10 and 11. Capacitor 5 is, via diode 12, interconnected with flash tube 1 and capacitors 6 and 7 over switching diode or thyristors (SCR) 13 and 14. On ignition of flash tube 1, there initially discharges capacitor 5 via the flash tube. In this case, there ensues a voltage drop on the thyristors or switching diodes 13 and 14 respectively, leading to the charging of capacitors 15 and 17 via their counterparts 16 or 18, respectively. The series resistance of capacitor assembly 17, 18 and of resistance 20 is greater than that of counterpart capacitors 15, 16 and resistance 19, so that the charging period of capacitors varies. The trigger diodes 21 and 22 are intercircuited between these potential dividers 15, 16, or 17, and 18 respectively and thyristors 13 and 14. Thyristors 25 and 26 are arranged in parallel with capacitors 15 and 17. Incorporated in the circuit of thyristors 25 and 26 are resistors 27 and 28, the latter are connected in series in the discharge circuit of quench tube 3. Rating of potentiometers 15, 16, 19 or 17, 18 and 20 respectively is such that following the flash tube 1 ignition and towards end of discharge of initial capacitor 5, there is obtained the switching voltage on trigger diode 21, leading to a triggering of thyristor 13, this in turn initiating discharge of capacitor 6. Towards the end of capacitor 6 discharge, trigger diode 22 activates thyristor 14, thus initiating a discharge of capacitor 7.

If during discharging of capacitor 5 achieving of the preselected value of the luminous intensity, a photoelectric-monitored ignition of tube 3 becomes effective, then discharge current of tube 3 will initiate a voltage drop at resistors 27 and 28, leading to a triggering of thyristors 25 and 26 and thus shorting the capacitors 15 and 17, rendering action of trigger diodes 21 and 22 ineffective. Provided therefore the photo flash action is interrupted — on attaining the required luminous intensity due to triggering of tube 3 or thyristor 3' — the residual energy of flash capacitor 5 is nullified, however, discharge of remaining capacitors 6 and 7 is prevented. With the light-monitored interruption of flash discharge, with capacitor 6 already spent, on-circuiting of third capacitor 7 is averted. Diode 12 prevents the wasteful re-charging of the discharged capacitor 5 during the subsequent ensuing discharge of counterparts 6 and 7.

That afore-said applies likewise for thyristors 13 and 14. During recharging process, parallel resistors 23 and 24 prevent a reloading of capacitors 15 and 17.

The current flow through tube 3 during ignition process is very high so that for the generation of the required control of voltages for thyristors 25 and 26 only low-rated resistors 27 and 28 are needed to generate the necessary voltage drop; their influence on the resistance of quenching circuit 3 therefore is small.

The layout example shows a distribution of the storage capacity over three capacitors 5, 6 and 7. It goes without saying that a subdivision into an arbitrary greater number of partial capacitances is possible.

As the energy requirements or ratings of a photographic flash unit increases with the square of the subject distance, there is recommended a quadratic or exponential stepping of capacitance values. With a six-step division there might consequently be obtained the following capacity series:

$$1 + 1 + 2 + 4 + 8 + 16$$

and a total capacity of 480 $\mu$F would be composed of the following capacities $$15 \mu F + 15 \mu F + 30 \mu F + 60 \mu F + 120 \mu F + 240 \mu F.$$

In the case of a unit having a guide member of 18 this would already correspond to a ± ½ lens stop.

Figure 1:
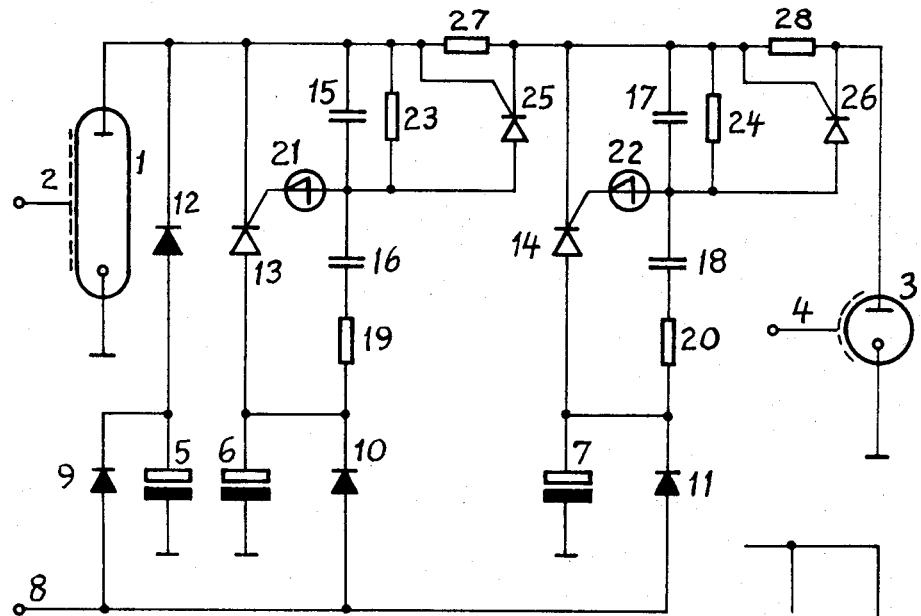
FIG. 1 depicts a circuit with automatic, sequential or successive on-circuiting of auxiliary capacitors with resultant interruption of this on-circuiting sequence by the quenching tube.
Figure 1A:
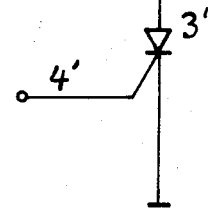
FIG. 1A illustrates a modification of the right hand portion of FIG. 1, substituting a quenching thyristor for the quench tube.
Figure 2:
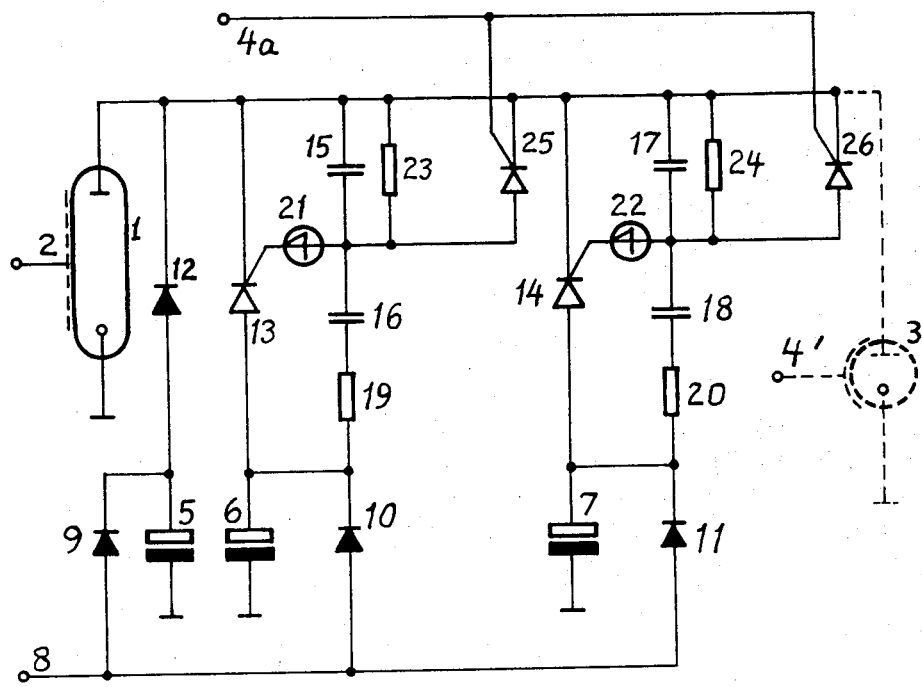
FIG. 2 shows a similar lay-out where, however, the interruption of the on-circuit function is effected by an additional impulse generated by a separate photoelectric measuring device.

With the design layout as per FIG. 2 we have basically the same build-up as that shown in FIG. 1. The difference is that the thyristors 25 and 26 are not triggered by resistors' 27 and 28 voltage drop action, namely at the moment of ignition of quenching tube 3 — but that the control of the thyristors or switching diodes 25 and 26, via connecting cable 4a, was effected directly by a photoelectric measuring device, irrespective whether this simultaneously also ignites quenching tube 3, over electrodes 4' or whether for this quenching tube a special and additional photoelectric measuring device, as the generally known type, is provided.

FIG. 3 displays a further design variation which differs as regards the luminosity measuring layout. In all other respects the build-up is identical to that of FIG. 2 for which reason there were also utilized the same reference types for identical components.

Phototransistor 31 is connected to trigger diode 21. On ignition of flash tube 1, i.e., on discharge of capacitor 5, on the thyristors 13 and 14 a voltage drop occurs so that on attainment of breakthrough voltage, trigger diodes 21 and 22 are through-circuited. Contemporarily photo transistor 31 is supplied with drop voltage until on attainment of the breakthrough voltage of trigger diode 21, the voltage breaks down. The measurement is therefore carried out within a fixed and pre-set period of time. In case of exceptionally intensive brightness triggering voltage of thyristors 25 and 26 is reached earlier than breakthrough voltage of trigger diode 21. This shunts capacitors 15 and 17, preventing a further voltage increase on trigger diodes 21 and 22. With lesser brightness, trigger voltage of thyristor 25 occurs later than trigger diode's 21 breakthrough voltage. Action of resistors 32a and 33a permits a setting of the desired on-circuit. The comparatively low-rated resistors 27 and 28 should, when utilizing a quench tube 3, generate a voltage drop which triggers thyristors 25 and 26 thus averting renewed voltage increase on trigger diodes 9 and 10, on quench tube 3 being triggered.

FIG. 4 shows a further modification. Here, measurement and on-circuiting of all needed auxiliary capacitors takes place immediately following the triggering of the flash tube by a measurement of the brightness of luminous intensity. The resultant action generates an impulse the voltage amplitude of which is proportional to the measured brightness.

This voltage amplitude then determines the number of auxiliary capacitors to be switched on or off, respectively. Basic layout is identical to that described prior. In parallel with the main capacitor or a flash tube circuit, there is ranged a capacitor 29a for the energy supply of photo transistor 31.

The photo transistor measures, during a short interval determined by the charging of capacitor 29a, the brightness reflected by the subject being photographed. This time interval is essentially shorter than that which must expire until capacitors 15 and 17 have attained the switching voltage of trigger diodes 21 and 22 and until the thyristors 13 and 14 trigger, thus initiating the discharge of capacitors 6 and 7 via the tube 1. The subject reflection light impinging on photo transistor 31 generates a voltage amplitude in induction 32, the height of which corresponds to the reflected luminosity. This voltage amplitude triggers thyristors 25 and 26 to the extent that their trigger voltage is exceeded. During the above, capacitors 15 and 17 are short-circuited so that trigger diodes' 21 and 22 switching voltage is not reached and therefore the through-circuiting of transistors 13 and 14 or discharge of capacitors 6 and 7 fails to take place.

It will be noted from the design example that induction coil 30a is provided with tappings 33, 34, 35 and 36 which are interlinked with the individual transistors 25 and 26 etc. On the voltage amplitude of these tappings exceeding the switching voltages of thyristors 25, 26 etc. no on-circuiting of the auxiliary capacitors will take place.

If voltage amplitudes exceed only partially the switching voltage of thyristors 25 and 26, only such capacitors 6, 7 will be on-circuiting where or during which thyristors 25 and 26 were not through-circuited. Note from the drawing that a random number of auxiliary capacitors can be catered for. In lieu of the depicted inductive tapping, the varying response sensivity of the thyristors 25 and 26 can also be achieved by corresponding voltage dividers in which case all thyristors 25, 26 etc. are connected to a common voltage amplitude of induction 32.

Considered chronologically there takes place immediately following the ignition of flash-tube 1, the measuring of the luminous intensity by a photo transistor 31, and there is generated a voltage amplitude the intensity of which finds or determines the extent of switching-off of capacitors 15, 17. Immediately following this, there are triggered the thyristors 13, 14 etc. of the non-switched off capacitors and the discharging those capacitors 6, 7, etc. is initiated. Triggering of thyristors 25, 26 etc. takes place simultaneously as does also the triggering of the thyristors 13, and 14 provided that no deviating component ratings, specifically the capacitance of capacitors 15, 17, are to effect a stepwise sequence or provided such sequence is desired.

In the case of the described subject lay-out the on-circuiting of auxiliary capacitors is effected by the short-circuiting or shunting of capacitors 15 and 17, the latter triggering for the power needs of diodes 21 and 22 and which, on attaining breakthrough voltage, trigger thyristors 13 and 14. Needless to say here that there can be provided in lieu of this short-circuit arrangement for capacitors 15 and 17 also a positive style cut-in control of such design that instead of a disconnection of triggered diodes 21 and 22 or the operating capacitors 15 and 17 of these, there is effected an on-circuiting.

What I claim is:

1. Electronic flash apparatus for photographic purposes, comprising flash tube means, a series of individual capacitors for powering said flash tube means, said series of capacitors being connected in parallel with each other and with said flash tube means, each capacitor except the first one of said series having electronic switch means shiftable between a non-conducting state and a conducting state and effective, when in a non-conducting state, to prevent discharge of its associated capacitor through said flash tube means, means for charging all of said capacitors and placing all of said electronic switch means in a non-conducting state, in preparation for a flash, and control means responsive to discharge of one capacitor in the series for shifting the electronic switch means of the next succeeding capacitor of the series to its conductive state so that such next succeeding capacitor may then discharge.

2. Apparatus as defined in claim 1, wherein said flash tube means comprises a single flash tube through which said individual capacitors discharge in succession.

3. Apparatus as defined in claim 1, wherein said electronic switch means comprises a separate thyristor operatively interposed in the discharge circuit of its associated capacitor.

4. Apparatus as defined in claim 3, wherein each of said thyristors (13 or 14) has a gate circuit operatively connected to a trigger diode (21 or 22).

5. Apparatus as defined in claim 4, wherein each of said trigger diodes (21 or 22) is part of a control circuit including auxiliary capacitors (15, 16 or 17, 18) and a second thyristor (25 or 26) operatively connected to one terminal of said flash tube means (1).

6. Apparatus as defined in claim 1, further comprising light integrating means for terminating duration of a flash produced by successive discharge of said series of capacitors through said flash tube means.

7. Apparatus as defined in claim 4, further comprising a photo transistor (31) operatively connected to said trigger diodes (21, 22) and effective, in response to a predetermined threshold value of light received thereby, to prevent discharge of additional capacitors of said series of capacitors.

8. Apparatus as defined in claim 1, further comprising an induction coil (30a, 32) having a plurality of taps (33, 34) each operatively connected to the control means (13, 21, 25, etc. or 14, 22, 26, etc.) for controlling discharge of one of the capacitors, respectively, of said series of capacitors, and a photo transistor (31) operatively connected to said induction coil and effective, when a predetermined threshold value of light is received by said photo transistor, to generate a voltage in said coil sufficient to operate said control means to avoid discharge of further capacitors of said series.

9. Electronic flash apparatus for photographic purposes comprising a flash tube (1), a first capacitor (5) in parallel with said flash tube and arranged, upon initiation of a flash, to be discharged through said flash tube, a second capacitor (6) operatively connected to said flash tube through first electronic switch means (13) which is normally non-conductive, first switch control means responsive to flow of current from said first capacitor through said flash tube for rendering said first electronic switch means conductive so that said second capacitor may then discharge through said flash tube, a third capacitor (7) operatively connected to said flash tube through second electronic switch means (14) which is normally non-conductive, and second switch control means responsive to flow of current from said second capacitor through said flash tube for rendering said second electronic switch means conductive so that said third capacitor may then discharge through said flash tube.

10. Apparatus as defined in claim 9, further comprising means responsive to light reflected from a subject to be photographed, for terminating a flash in said flash tube when the quantity of said reflected light reaches a predetermined threshold value.

* * * * *

UNITED STATES PATENT OFFICE
CERTIFICATE OF CORRECTION

Patent No. 3,725,734    Dated April 3, 1973

Inventor(s) Arthur Schneider

It is certified that error appears in the above-identified patent and that said Letters Patent are hereby corrected as shown below:

On the cover sheet [75], "Wiesenweg, Germany" should read -- Voelkenrode, Germany --.

Signed and sealed this 28th day of August 1973.

(SEAL)
Attest:

EDWARD M. FLETCHER, JR.         RENE D. TEGTMEYER
Attesting Officer               Acting Commissioner of Patents